United States Patent
Phung et al.

(10) Patent No.: US 10,895,313 B2
(45) Date of Patent: Jan. 19, 2021

(54) PULLEY ASSEMBLY FOR A ROTARY ELECTRICAL MACHINE

(71) Applicant: Valeo Equipements Electriques Moteur, Creteil (FR)

(72) Inventors: Michel Phung, Creteil (FR); Xavier Collin, Creteil (FR); Jérome Giry, Creteil (FR)

(73) Assignee: Valeo Equipements Electriques Moteur, Creteil (FR)

( * ) Notice: Subject to any disclaimer, the term of this patent is extended or adjusted under 35 U.S.C. 154(b) by 362 days.

(21) Appl. No.: 16/074,596

(22) PCT Filed: Jan. 30, 2017

(86) PCT No.: PCT/FR2017/050210
§ 371 (c)(1),
(2) Date: Aug. 1, 2018

(87) PCT Pub. No.: WO2017/134376
PCT Pub. Date: Aug. 10, 2017

(65) Prior Publication Data
US 2019/0056022 A1  Feb. 21, 2019

(30) Foreign Application Priority Data
Feb. 3, 2016  (FR) ..................... 16 50836

(51) Int. Cl.
*F16H 55/36* (2006.01)
*H02K 7/10* (2006.01)
(Continued)

(52) U.S. Cl.
CPC ......... *F16H 55/36* (2013.01); *F16F 15/1216* (2013.01); *H02K 7/1004* (2013.01); *H02K 7/108* (2013.01); *F16H 2055/366* (2013.01)

(58) Field of Classification Search
CPC ........ F16D 41/206; F16D 41/22; F16D 13/28; F16H 2055/366; F16H 55/36
(Continued)

(56) References Cited

U.S. PATENT DOCUMENTS 2,885,896 A * 5/1959 Hungerford, Jr. ........ F16H 9/04
474/70
7,878,315 B2 * 2/2011 Saito ..................... F16D 41/206
192/41 S
(Continued)

FOREIGN PATENT DOCUMENTS

EP  0 515 259 B1  1/1999
FR  2 603 429 A1  3/1988
(Continued)

OTHER PUBLICATIONS

International Search Report issued in PCT/FR2017/050210 dated Apr. 13, 2017 (3 pages).
(Continued)

*Primary Examiner* — Henry Y Liu
(74) *Attorney, Agent, or Firm* — Osha Bergman Watanabe & Burton LLP

(57) ABSTRACT

Pulley assembly (111) comprising a hollow shaft (112) with an axis X, the hollow shaft (112) being suitable for being mounted on a shaft of a rotating electrical machine, the hollow shaft comprising at least one thread or tapping (132, 133) and a collar (113) extending radially outwards, wherein said hollow shaft also includes: a nut (128, 129) screwed on the hollow shaft via the thread or tapping; a spring (126) mounted about a portion of the nut; at least one ball bearing (122, 123) tightly fitted to the hollow shaft; a pulley (130), tightly fitted to said at least one bearing, about the spring, the nut and the hollow shaft. The nut (128, 129) includes a radial shoulder (131) mounted between the spring (126, 127) and
(Continued)

the ball bearing (122, 123), the spring being held axially between the collar (113) and the radial shoulder (131).

15 Claims, 8 Drawing Sheets

(51) Int. Cl.
*H02K 7/108* (2006.01)
*F16F 15/121* (2006.01)

(58) Field of Classification Search
USPC .......................................................... 474/70
See application file for complete search history.

(56) References Cited

U.S. PATENT DOCUMENTS

| | | | |
|---|---|---|---|
| 7,931,552 B2 * | 4/2011 | Pendergrass | F16D 41/22 |
| | | | 474/74 |
| 8,529,387 B2 * | 9/2013 | Lannutti | F16D 41/22 |
| | | | 474/74 |
| 8,820,502 B2 * | 9/2014 | Chang | F16D 41/066 |
| | | | 192/45.018 |
| RE47,143 E * | 11/2018 | Mevissen | F16D 13/12 |
| 2007/0240964 A1 * | 10/2007 | Saito | F16D 41/206 |
| | | | 192/41 S |
| 2009/0272618 A1 * | 11/2009 | Pendergrass | F16D 41/22 |
| | | | 192/41 S |
| 2010/0116617 A1 * | 5/2010 | Serkh | F16H 55/36 |
| | | | 192/41 S |
| 2010/0147646 A1 * | 6/2010 | Lannutti | F16D 13/28 |
| | | | 192/41 S |
| 2011/0198185 A1 * | 8/2011 | Lannutti | F16D 1/097 |
| | | | 192/76 |
| 2011/0245000 A1 * | 10/2011 | Serkh | F16F 15/1217 |
| | | | 474/94 |
| 2016/0312875 A1 * | 10/2016 | Liu | F16D 41/206 |

FOREIGN PATENT DOCUMENTS

| | | |
|---|---|---|
| FR | 2 734 425 A1 | 11/1996 |
| FR | 2820896 A1 | 8/2002 |
| JP | 2003-322174 A | 11/2003 |
| JP | 2012-112480 A | 6/2012 |
| WO | 92/06527 A1 | 4/1992 |
| WO | 2006/081657 A1 | 8/2006 |
| WO | 2012/061930 A1 | 5/2012 |

OTHER PUBLICATIONS

Written Opinion of the International Searching Authority issued in PCT/FR2017/050210 dated Apr. 13, 2017 (6 pages).

* cited by examiner

PULLEY ASSEMBLY FOR A ROTARY ELECTRICAL MACHINE

TECHNICAL FIELD OF THE INVENTION

The present invention relates to a pulley assembly for a rotary electrical machine, and to a rotary electrical machine comprising a pulley assembly of this type.

TECHNOLOGICAL BACKGROUND

In a known manner, rotary electrical machines for motor vehicles comprise a pulley. This pulley is connected to a belt, which itself is connected to a shaft of the thermal engine of the motor vehicle.

FIG. 1 represents a polyphase alternator provided with a pulley according to the prior art. This alternator is designed for a motor vehicle, and is constituted mainly by a housing 12 in two parts 15, 17 connected to the mass of the motor vehicle, and supporting in its interior two main units which are a stator 14 and a rotor 16 as described for example in document EP B 0 515 259, to which reference will be made for further details. The parts 15, 17 thus comprise lugs in order to be secured on a fixed part of the vehicle.

The stator 14 surrounds the rotor 16, which is integral with a rotor shaft 18, on the rear end of which two collector rings 20 are secured, whereas a pulley 30 is integral with the front end of the shaft 18. This pulley, which in this case is grooved, is designed to receive a belt with a complementary form forming part of a movement transmission device driven by the internal combustion engine of the motor vehicle.

The stator 14 is composed of a body 22, which in this case is constituted mainly by an axial stack of transverse metal plates made of soft iron.

The inner annular face of the body 22 comprises axial grooves, which extend radially towards the exterior, and receive axial strands of electrical windings 32. The grooves are open towards the interior, as shown for example in document FR A 2 603 429.

Each electrical winding 32 is constituted for example by the winding with turns of an electrically conductive element, in this case a copper wire, which is coated with at least one layer of electrically insulating material, for example a polyester in two layers, one of the polyimide type, and the other of the polyamide imide type.

The axial strands are extended by transverse joining strands which form chignons (with no reference) projecting on both sides of the body 22 of the stator 14, according to FIG. 1.

As a variant, use is made of conductors in the form of bars, such as pins, with a circular or rectangular cross-section, fitted in the axial grooves in the stator 14, as described in document WO-92/06527. As a variant, four electrically conductive elements are fitted superimposed radially per groove, as described in application document FR 01 04770 filed on May 4, 2001.

In this case, the rotor 16 is a rotor with claws provided with an electrical winding 62 with cylindrical excitation, which is fitted between two metal plates 64 and 66, each comprising on their outer periphery claws which extend axially in the direction of the other plate 66 and 64. The ends of the winding 62 are connected to the rings 20 in a known manner by wired connections. The plates 66, 64 are in this case extended on their inner periphery by a cylindrical portion in order to support the winding 62. As a variant, a cylindrical core is fitted on the shaft 18, and is interposed between the two plates in order to support the winding 62.

Each plate-claw assembly constitutes a magnet wheel, which in this case is made of magnetic steel. Each magnet wheel is secured on the shaft by means of knurled parts of this shaft 18. The claws are offset angularly from one wheel to another, such that a claw of the plate 64 is interposed between two adjacent claws of the plate 66, and conversely. For further details, reference will be made to document EP-B-0515259 which also shows the other components of the alternator. In this case the alternator thus has internal ventilation, with each plate 64, 66 supporting a fan, respectively 102, 104, adjacent to the part 15, 17 concerned of the housing.

Each part 15, 17 of the housing 12 is perforated for circulation of the air, and supports centrally a ball bearing 26, 28, for support with rotation respectively of the front and rear ends of the shaft 18. Thus, one of these parts is known as the front bearing 15 (the one adjacent to the pulley 30), and the other is known as the rear bearing 17.

The rear bearing 17 supports an arrangement 23 for rectification of the alternating current produced by the stator, and a brush-holder 25, the brushes of which cooperate with the collector rings 20.

A protective cover 27 is also provided, which is integral with the rear bearing 17, and covers firstly the brush holder 25, which is connected in a known manner to a regulation device in order to regulate the current and the voltage of the winding 62, and secondly it covers the rectification arrangement 23, provided with diodes which in this case are fitted head to tail as can be seen in FIG. 1. The rectification arrangement 23 comprises the rear bearing 17 supporting the so-called negative diodes, a positive metal radiator supporting the so-called positive diodes, and a connector interposed between the rear bearing and the positive radiator, in particular in order to connect the diodes as described in document FR A 2 734 425, to which reference will be made for further details.

The front 15 and rear 17 bearings are made of metal, in this case based on aluminium, whilst having a hollow form delimited by a transverse flange supporting the ball bearing 26, 28 concerned, and by a peripheral rim with axial orientation, one of which in this case has a shoulder on its interior in order to support the stack of metal plates of the body of the stator by means of screws 29 supported on a crown belonging to an annular brace (with no reference), with a with a support setback on the bearing 15 in order to clamp the body 22 between the crown and the aforementioned shoulder. As a variant, the bearing 17 also has a shoulder, such that the body 22 is clamped between the two shoulders of the bearings 15, 17.

In a known manner, the flanges and the rims have openings for circulation of the air. Thus, the rims have openings opposite the axial ends of the windings 32, known as chignons, extending projecting axially relative to the body 22 of the stator 14, whereas the flanges have openings opposite the blades of the fans 102, 104. These bearings are secured by means of screws or tie rods, shown for example in FIG. 1 of the aforementioned document EP B 0515259. As a variant, a single fan is implanted on the exterior at the pulley. As a variant, the bearings 15, 17 are provided in the interior with channels for circulation of a cooling fluid, such as the cooling fluid of the motor vehicle engine.

The pulley 30 is hollow in its interior for accommodation of the threaded front end 40 of the shaft 18, a nut 41 and a support washer 42 which is interposed between the transverse base 43 of the pulley 18 and the nut 41 screwed onto the threaded end 40. The base 43 is perforated centrally, as is a first annular brace 44 and a second annular brace 45, for passage of the shaft 18. The inner ring 50 of the ball bearing 26 is fitted clamped on a smooth cylindrical support surface 70 of the shaft 18, with the braces 44, 45 being fitted on both sides of this ring 50. The outer ring 51 of the bearing 26 is fitted in a receptacle provided in the inner periphery of the transverse flange 19 of the front bearing 15, i.e. centrally in the front bearing 15.

The receptacle is delimited by an annular support surface 52 with axial orientation which is extended radially towards the interior by a transverse wall 53 surrounding the first brace 44 with a slight gap. The front face of the ring 51 is supported on the outer periphery of the portion 53, whereas the rear face of the ring 51 is in contact with a washer 55 secured by means of screws on the flange 19 above the support surface 52 in contact with the outer periphery of the outer ring 51. The ring 51 is thus clamped between the washer and the wall 53. The first annular brace 44 is implanted axially between the base 43 of the pulley 30 and the inner ring 50 of the ball bearing 26.

In a known manner, the rings 50, 51 have tracks for the balls 54 interposed radially between the rings 50, 51.

The bearing 26 is advantageously lubricated conventionally by means of grease, and seals which are integral with the outer ring 51 are provided at each axial end of the bearing, in order to prevent the grease from escaping, such that the bearing 26 is sealed.

A cage is provided in order to retain the balls 54. The seals (with no reference) of the bearing 26 are represented by lines. These seals are recessed relative to the axial ends of the bearing 26.

The seals are integral with the outer ring 51 of the bearing, and are in contact with the outer periphery of the inner ring 50.

The first brace 44 has a tubular form, and at its front end has an annular rim with transverse orientation for contact with the base 43. As a variant, the first brace is integral with the base 43 which is then thicker. The second brace 45 has a tubular form, and is implanted axially between the inner ring 50 of the bearing 26 and the plate 64 of the adjacent magnet wheel. The shaft 18 is shouldered at the rear face of the plate 66 of the other magnet wheel.

Thus, by clamping the screw 41 supported on the washer 42, there is axial immobilisation, by means of the braces 44, 45, of the pulley 43, the ring 50 and the plates 64, 66 which are fixed in rotation thanks to the knurling of the shaft 18 which is harder than the plates 64, 66, in order to cut furrows when the shaft 18 is forced into the central bores in the plates 66, 64.

The pulley 30 is thus integral in rotation with the shaft 18, thanks to the clamping carried out. The ring 50 is also integral in rotation with the shaft 18, since it is forced onto the shaft.

This fitting is tighter than the fitting of the outer ring 51 in the support surface 52.

FIG. 2 represents a pulley assembly 111 of the decoupler type according to the prior art. It comprises a hollow shaft 112 provided with an axis X. The hollow shaft 112 comprises a left axial end 114 and a right axial end 115, the two axial ends being separated by a collar 113 which extends radially towards the exterior. The right axial end 115 is covered with a removable protective lid 117.

The inside of the hollow shaft 112 is formed by a plurality of bores with an axis X. Thus, it comprises a first bore 118 which opens onto the left axial end 114, a second bore 119 which is situated overlapping the left axial end and the right axial end, a third bore 120 on the right axial end 121, and finally a fourth bore which opens onto the right axial end. The diameters of these four bores are such that the diameter of the second bore is smaller than the diameters of the first, third and fourth bores. For example, the diameters of the first and third bores are substantially equal. For example the diameter of the fourth bore is larger than the diameters of the first and third bores.

The hollow shaft 112 can receive a shaft of a rotary electrical machine introduced into its left axial end 114. The shaft of the rotary electrical machine is then integral in rotation with the hollow shaft, for example by screwing of the hollow shaft onto the shaft of the rotary electrical machine.

For example, the hollow shaft 112 is screwed by means of a thread onto the bore 119, with the thread cooperating with the shaft of the rotary electrical machine. The pulley assembly is for example screwed by means of a tool (not represented), fitting inside the bore 121. For this purpose, the bore 121 is provided with ribbing 116. During this screwing, the protective lid 117 is removed.

The pulley assembly 112 additionally comprises two ball bearings 122 and 123 respectively fitted on the left axial end 114 and the right axial end 115 of the hollow shaft 112.

The pulley assembly 112 comprises a pulley 130 which for example has a flat profile as represented, or for example a profile designed for a belt ribbed in the form of a "V". The pulley is fitted on the two ball bearings 122 and 123. Thus, the pulley is fitted such as to rotate around the hollow shaft 112.

The bearing 122 comprises firstly an inner crown which is connected in rotation to the hollow shaft 112, and secondly an outer crown which is connected in rotation to the pulley 130. Similarly, the bearing 123 comprises firstly an inner crown which is connected in rotation to the hollow shaft 112, and secondly an outer crown which is connected in rotation to the pulley 130. For each of the bearings 122 and 123, the outer crown rotates on a plurality of elements, for example balls, around the inner crown.

The pulley 130 is forced onto the outer crown of the bearings 122 and 123. Its inner surface can be ductile or soft enough for this fitting. Its surface is also preferably hard enough to withstand the friction of the spring. The area of the inner surface of the pulley in which the friction will make contact can thus form the basis of specific treatment in order to increase its hardness.

The pulley assembly 111 additionally comprises two nuts 124 and 125 which are screwed respectively onto the left axial end 114 and the right axial end 115 of the hollow shaft 112.

For this purpose, the left axial end 114 and the right axial end 115 of the hollow shaft each comprise a thread or tapping 132 or 133 on their outer surface.

In addition, in order to ensure the function of coupling or uncoupling, the pulley assembly also comprises springs 126 and 127 which are fitted respectively on the nuts 124 and 125. By means of contact with the pulley 130 on the one hand and the nuts 124 and 125 on the other hand, the two springs 126 and 127 allow torque to be able to be transmitted between the pulley 130 and the shaft 112.

However, the durability of this pulley assembly can be improved. In fact, during its operation, the springs working along the axis X exert an axial force on the bearings 122 and 123. Thus, the spring 126 compressed between the collar 113 and the bearing 122 exerts a force to the left on the outer crown of the bearing 122. Similarly, the spring 127 compressed between the collar 113 and the bearing 123 exerts a force to the right on the outer crown of the bearing 123. These forces are detrimental, since they can give rise for example to destruction of the bearing by displacement of the outer crown of the bearing relative to the other crown, or even to ejection of the bearing.

There is therefore a need for a pulley assembly with improved durability.

OBJECTIVE OF THE INVENTION

The objective of the invention is thus to fulfil this need whilst eliminating at least one of the aforementioned disadvantages.

According to the invention, a pulley assembly is provided comprising a hollow shaft provided with an axis, the hollow shaft being designed to be fitted on a shaft of a rotary electrical machine, the hollow shaft comprising at least one thread or tapping and a collar which extends radially towards the exterior, the said pulley assembly additionally comprising:

a nut screwed onto the hollow shaft by means of the said at least one thread or tapping;

a spring fitted around a part of the nut;

at least one ball bearing fitted clamped on the hollow shaft;

a pulley fitted clamped on the said at least one bearing, around the spring, the nut and the hollow shaft.

According to a general characteristic of the invention, the nut comprises a radial shoulder fitted between the spring and the ball bearing, the spring being retained axially between the collar and the radial shoulder.

Thanks to the radial shoulder, when the spring is working axially, it does not act on the ball bearing, but on the nut which is screwed on the hollow shaft. This therefore prevents any risk of ejection of the ball bearing or of destruction of the ball bearing by displacement of the outer crown relative to the inner crown.

When the springs come into contact with the inner surface of the pulley, they can hollow it out. This phenomenon occurs all the more since the inner surface of the pulley can be designed to be ductile or soft enough to receive the outer crown of the two bearings by fitting. In order to prevent this phenomenon, it is possible to carry out a treatment on the inner surface of the pulley. It is also possible to position an intermediate part, for example a spring or a ring, placed or glued on the inner surface of the pulley.

The assembly can additionally comprise an intermediate part against the inner peripheral surface of the pulley, which according to one embodiment is a spring, and is integral with the pulley in order to avoid excessive wear of the inner surface of the solid pulley. In fact, the intermediate part will be made of a material harder than that of the pulley, which requires appropriate properties for the machining.

However, according to this general characteristic, since the spring is contained between the collar and the radial shoulder, the shoulder makes it possible to define the area in which the spring will come into contact with the inner surface of the pulley. Thus defined, it is not necessary to apply a treatment or to provide the intermediate part on the remaining part of the inner surface of the pulley.

According to other characteristics taken in isolation or in combination:

on the side of the collar which is axially opposite the said nut, the pulley assembly comprises a second nut, a second ball bearing and a second spring, the second nut being screwed on the hollow shaft by means of the said at least one thread or tapping, the second spring being fitted around a part of the second nut, the second ball bearing being fitted tightly on the hollow shaft, and the second ball bearing comprises a radial shoulder fitted between the second spring and the second ball bearing, the second spring being retained axially between the collar and the shoulder of the second nut. This therefore provides the same advantages relative to durability of the bearings for a pulley assembly comprising two ball bearings and two springs, thus withstanding greater radial loads, and permitting better coaxiality of the pulley relative to the shaft of the rotary electrical machine;

at the collar, the pulley assembly comprises a notch for receipt of the end of the spring. This permits reproducible positioning of the spring between all the parts produced. It also permits retention of the spring;

the nut is screwed tightly against the collar, and the end of the spring in the notch is situated between the collar and the nut. This permits confinement of the end of the spring between the collar and the nut;

the nut forms an axial stop for the spring. This permits axial retention of the end of the spring which is total, in the sense that the end is blocked axially in both possible directions along the axis X, by the nut and by the collar;

the notch for receipt of the end of the spring is formed between the collar and the nut, the said notch being open radially along the entire length of the portion of the spring which is accommodated in it. This therefore prevents radial retention of the end because of the radial clearance possible for the spring, and therefore prevents the occurrence of a point of concentration of the stresses on the spring. It also ensures retention of the spring without needing to secure one of its ends radially;

the pulley assembly additionally comprises a washer positioned around the hollow shaft between the nut and the collar, and wherein the nut is screwed tightly against the washer, the washer being clamped against the collar, and the end of the spring in the notch being situated between the washer and the collar;

the notch for receipt of the end of the spring is formed between the collar and the washer, the said notch being open radially along the entire length of the portion of the spring which is accommodated in it;

the notch for receipt of the end of the spring is formed in the collar. For example, the notch is delimited by an inner arch and an outer arch. This permits radial retention of the end of the spring which is total, in the sense that the end is blocked radially in both directions, towards the inside by the inner arch towards the outside by the outer arch;

the axial depth of the notch is greater than the axial thickness of a turn of the spring. In the case when the nut is clamped at the collar, this ensures more efficient clamping, since it is simpler to clamp a nut on a flat surface, i.e. the surface of the collar perpendicular to the axis X, than on an end of a spring;

the spring is a helical spring;

the spring is a spring with rectangular turns;

the nut and the spring permit coupling between the hollow shaft and the pulley;

the nut is a brake nut. This therefore provides a nut which will not become unscrewed, and will thus act as a stop with an invariable position for the spring.

The invention also relates to a rotary electrical machine comprising a pulley assembly as defined above.

BRIEF DESCRIPTION OF THE FIGURES

The invention will be better understood by reading the following description and examining the figures which accompany it. These figures are provided purely by way of illustration of the invention which is in no way limiting.

Elements which are identical, similar or analogous retain the same reference from one figure to another.

Figure 1:
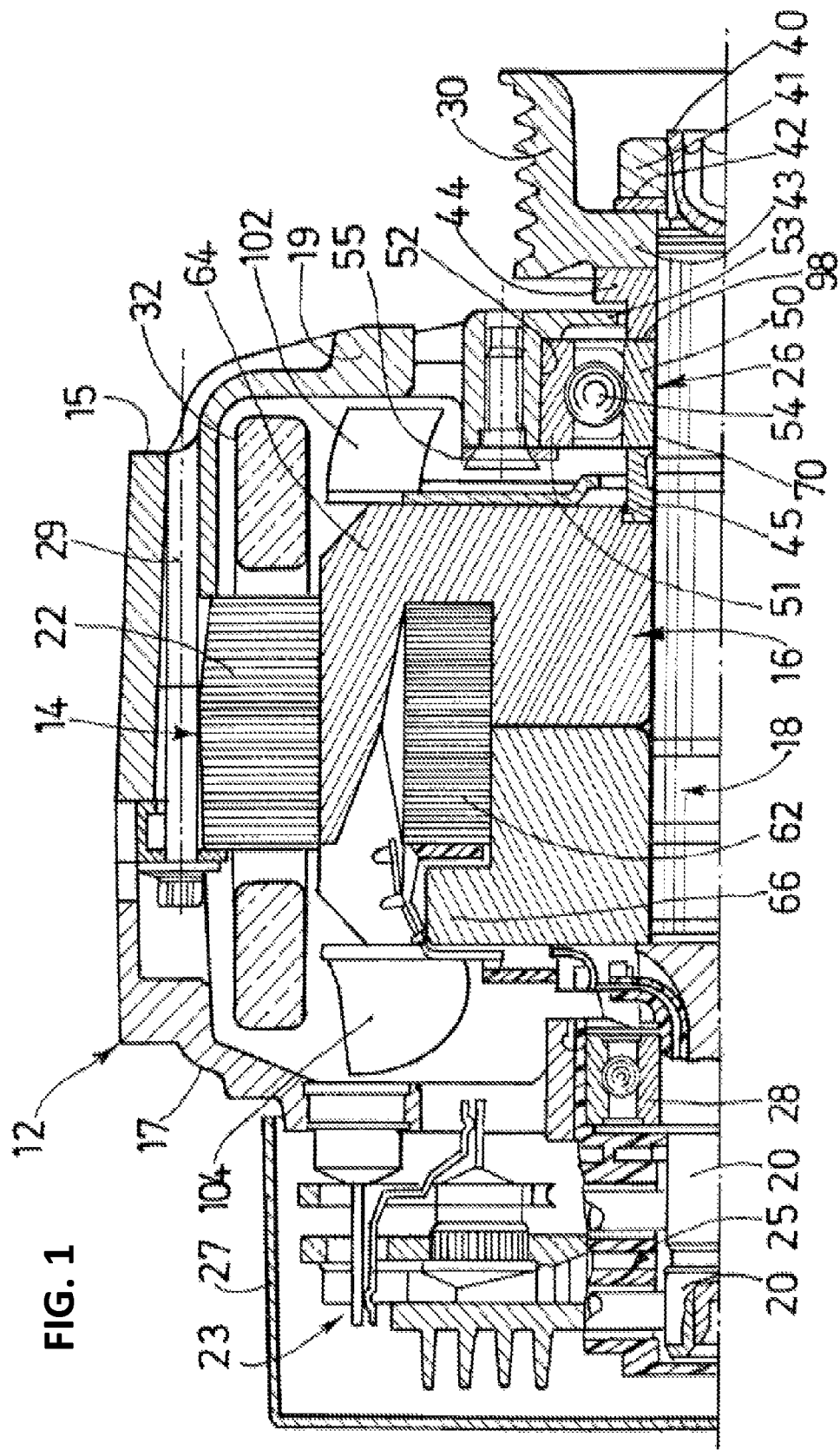
FIG. 1, already described, represents a view in cross-section of a rotary electrical machine provided with a pulley according to the prior art.
Figure 2:
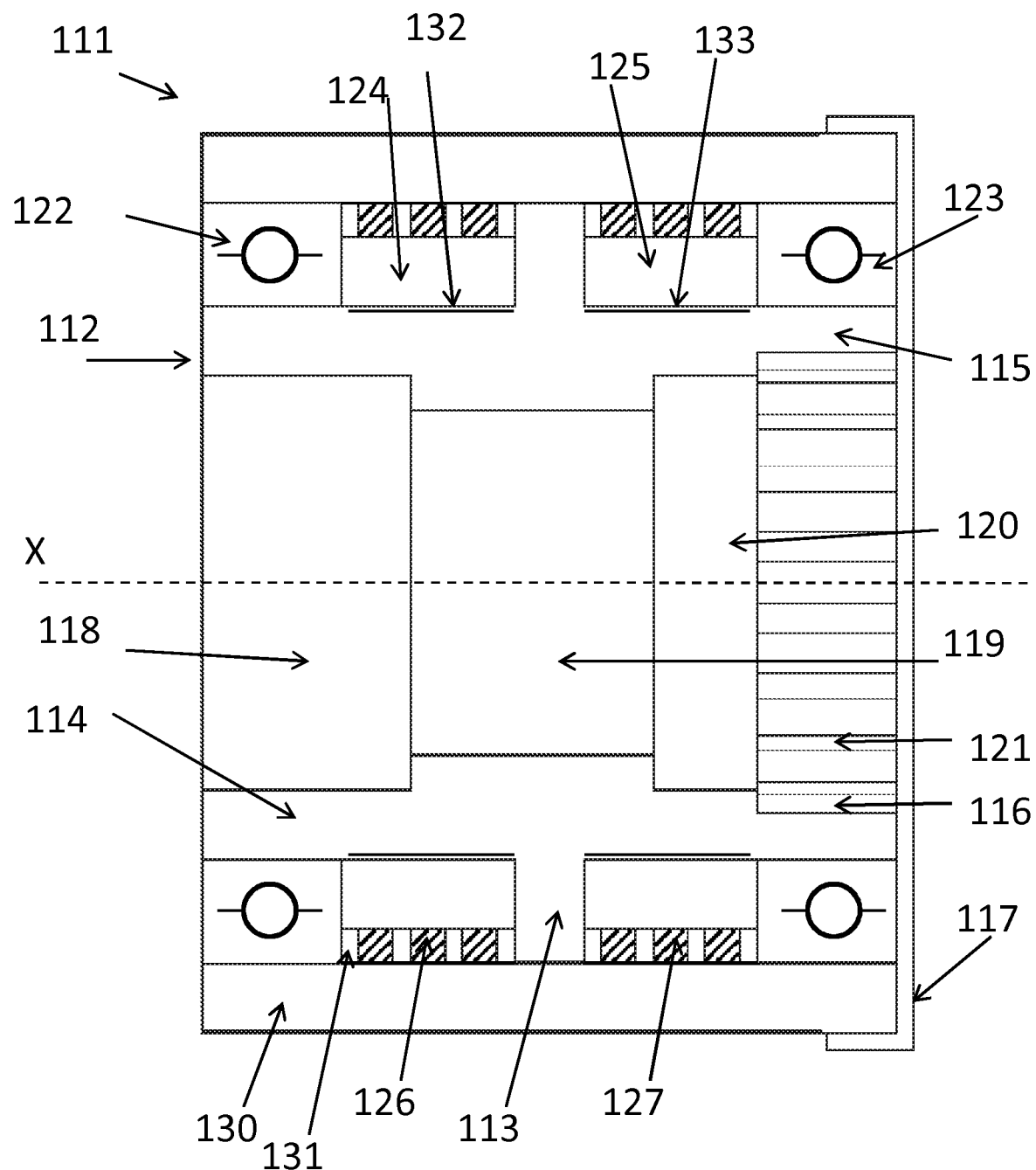
FIG. 2, already described, is a view in cross-section of pulley assembly of a decoupler type according to the prior art.

The directions left and right are defined with reference to the axis X in FIG. 2, with left being situated on the side of the electrical machine when the pulley assembly is fitted on the electrical machine, and right being situated on the opposite side.

DESCRIPTION OF EMBODIMENTS OF THE INVENTION

Figure 3:
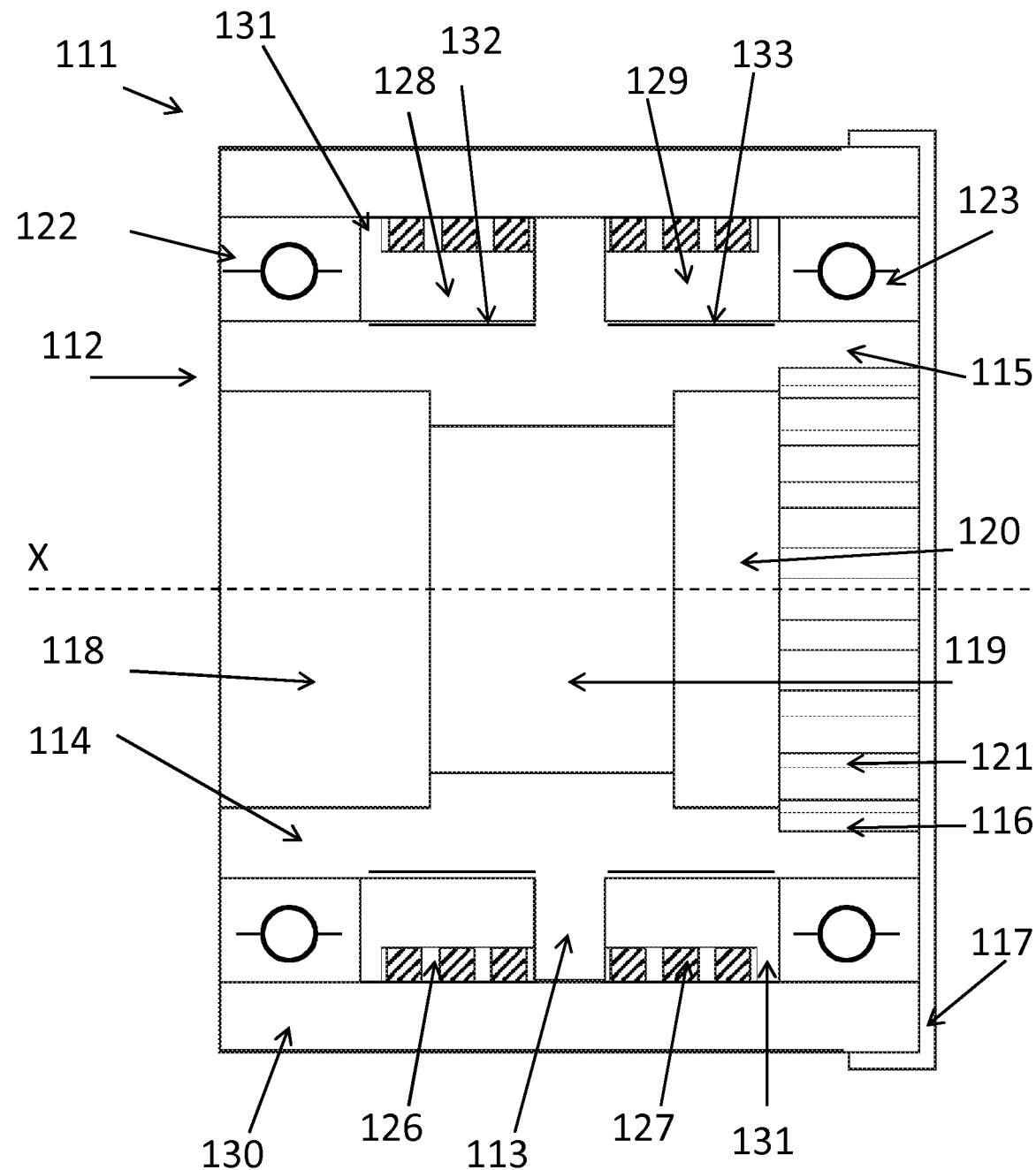
FIG. 3 is a view in cross-section of a pulley assembly according to the invention.

FIG. 3 represents a pulley assembly according to the invention. This assembly is distinguished from that in FIG. 2 in particular by the following elements: the springs 126 and 127, the nuts 128 and 129 and the collar 113 of the hollow shaft.

The nut 128 is distinguished from the nut 124 in that it comprises a radial shoulder 131 fitted between the spring 126 and the ball bearing 122, the spring thus being retained axially between the collar 113 and the shoulder 131. Thus, the spring 126 does not act on the ball bearing 122 but on the nut 128. According to one embodiment, the radial shoulder 131 is in a single piece with the nut 128. However, this is not necessary: it is sufficient that, when the spring applies an axial force on the radial shoulder, this force is not applied to the bearing but is transmitted to the nut 128, and therefore to the hollow shaft 112 on which it is screwed. This is therefore a radial shoulder 131 which is supported axially on the nut 128. For example, a washer which is fitted in a circular groove in the outer surface of the nut 128 could also act as the radial shoulder 131.

Similarly, in order to improve the durability of the ball bearing 123, the nut 129 is distinguished from the nut 125 in that it comprises a radial shoulder 131 fitted between the spring 127 and the ball bearing 123. Similarly, the radial shoulder 131 can be in a single piece with the nut 129. A radial shoulder 131 can also be provided which is supported axially on the nut 129. For example, a washer which is fitted in a circular groove in the outer surface of the nut 129 could also act as the radial shoulder 131.

The nuts 128 and 129 are fitted respectively on the left axial end 114 and the right axial end 115 by means of threads or tapping 132 and 133.

Figure 4:
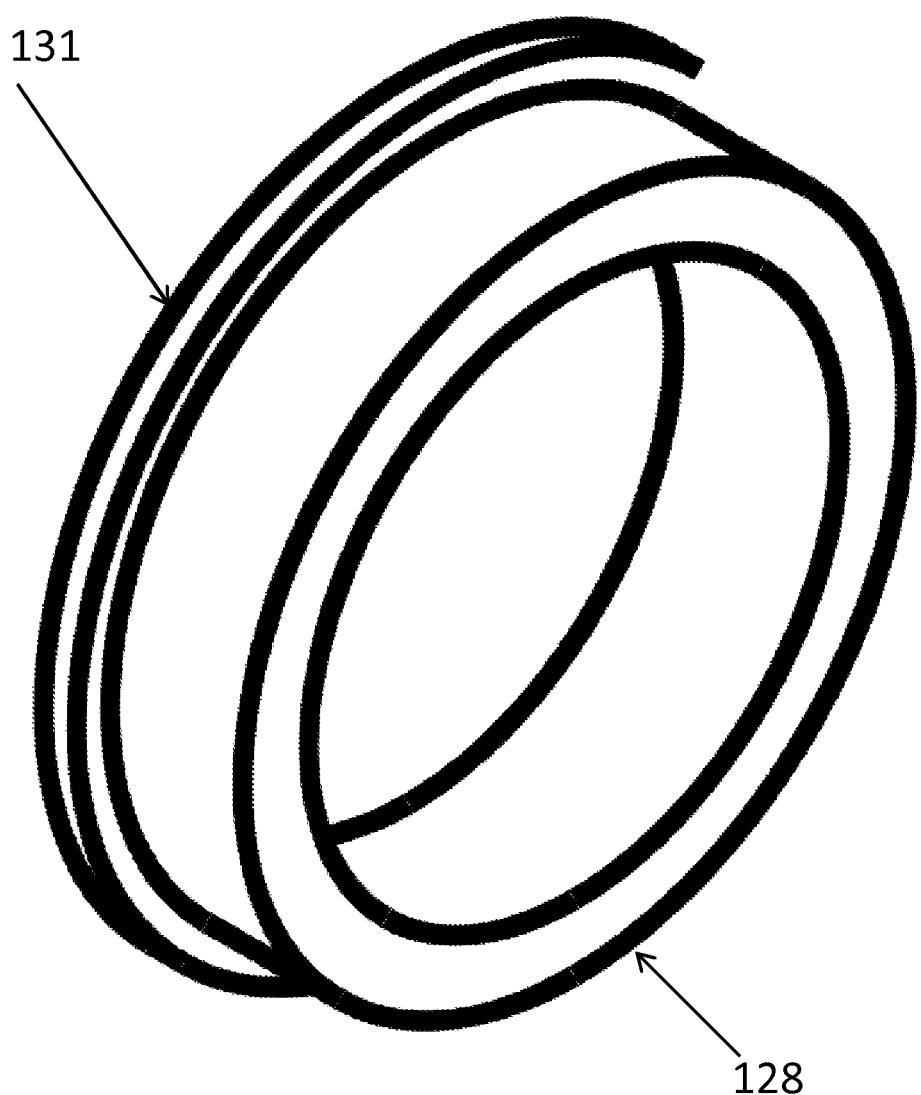
FIG. 4 shows a view in perspective of a nut for the pulley assembly according to the invention.

FIG. 4 represents the nut 128 provided with a radial shoulder 131 according to the invention. According to the embodiment illustrated in FIG. 4, the radial shoulder 131 is in a single piece with the nut 128.

Figure 5:
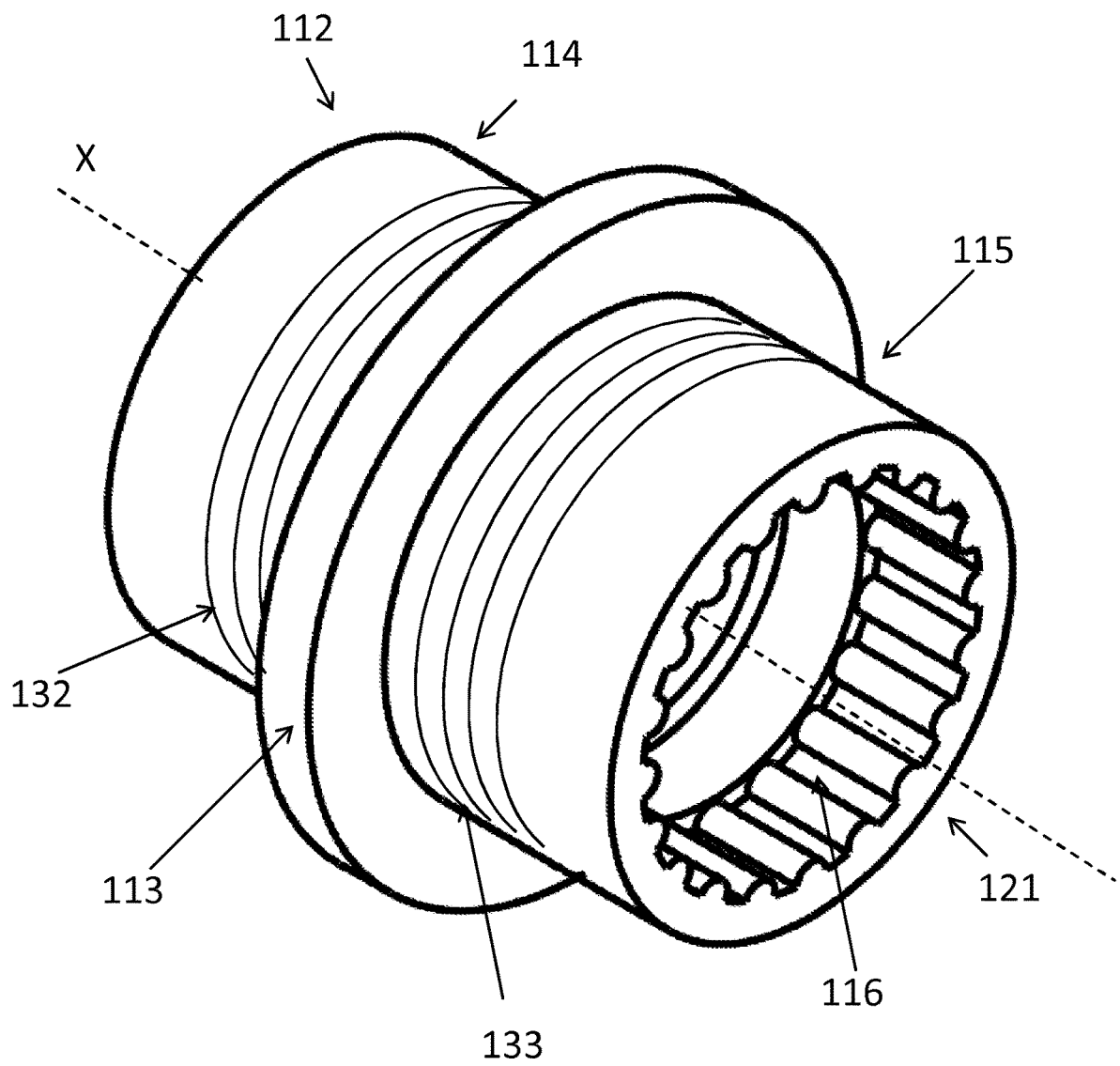
FIG. 5 shows a view in perspective of a hollow shaft for the pulley assembly according to the invention.

FIG. 5 represents schematically in perspective the hollow shaft 112 provided with an axis X. It is possible to see the left axial end 114, the right axial end 115, the collar 113 separating the two ends, and the bore 121 provided with ribbing 116. It is also possible to see the threads 132 and 133 with which the left and right axial ends respectively are provided. According to an embodiment which is an alternative to that illustrated in FIG. 5, the left 114 and right 115 axial ends are each provided with tapping in order to form a screw pitch which cooperates with the nuts 128 and 129 respectively.

The left axial end 114 is the one into which the shaft of the electrical machine is introduced. It is thus situated on the side of the rotary electrical machine.

Figure 6:
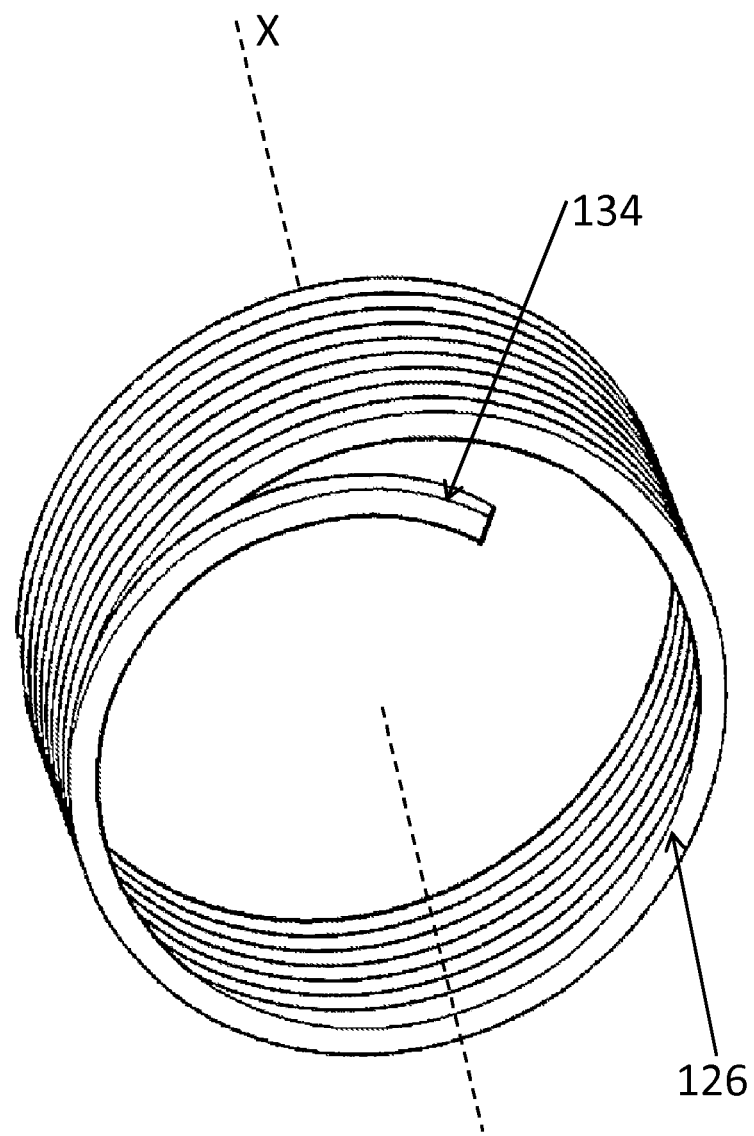
FIG. 6 shows a view in perspective of a spring for the pulley assembly according to the invention.

FIG. 6 represents in perspective the spring 126, being placed at the level of the collar 113, and facing towards the left axial end 114. The spring is provided with an end 134. For example, and as illustrated in FIG. 6, the spring 126 is provided with rectangular turns, i.e. turns with a rectangular cross-section according to a plane which passes via the axis X. For example, the spring is a helical spring.

Figure 7:
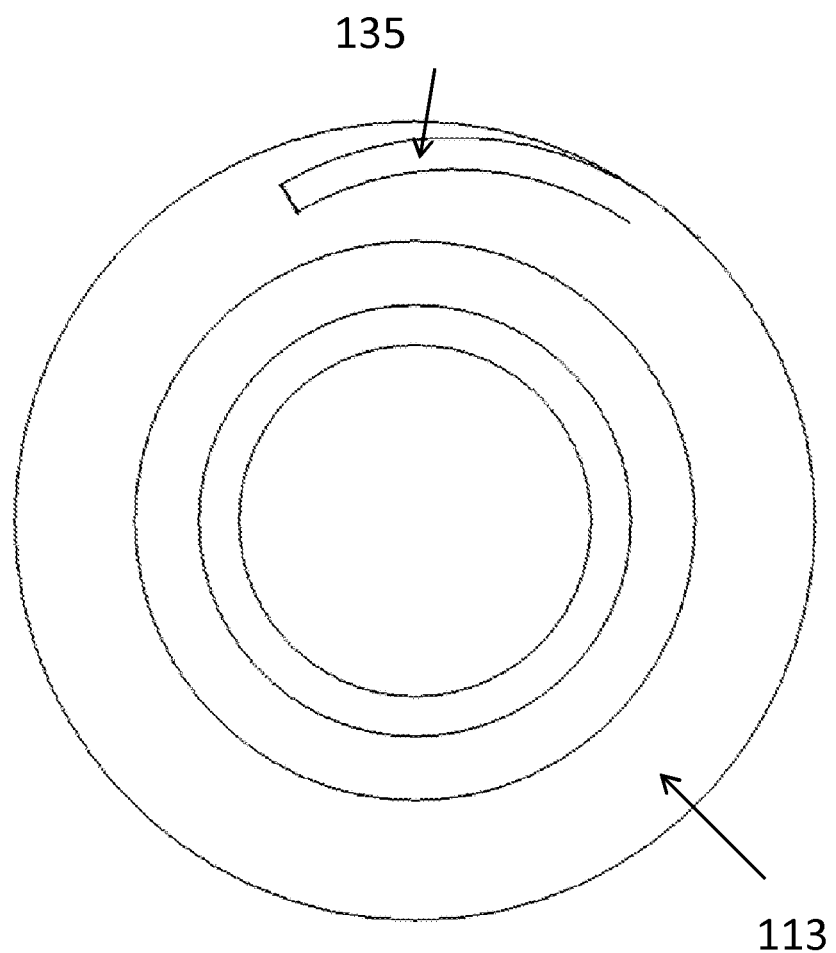
FIG. 7 shows a front view of the hollow shaft for the pulley assembly according to an embodiment of the invention.

FIG. 7 illustrates the collar 113 seen according to the axis X, whilst being placed on the left axial end 114 side, and according to a first embodiment of the invention. In this view, four concentric circles can be seen with their centre on the axis X. Starting from the centre towards the exterior, the first circle corresponds to the bore 119, the second circle corresponds to the bore 118, the third circle corresponds to the outer surface of the left axial end 114, and the fourth circle corresponds to the collar 113. It can be seen that a notch 135 is provided in the collar 113. This notch is designed to receive the end 134 of the spring 126.

For example, the nut 128 can be screwed tightly against the collar, as can be seen in FIG. 3. According to another example, a thread or tapping 132 can be provided which stops slightly beyond the collar, such that, when the nut is screwed down in the thread, it is not clamped on the collar. In both cases, the nut 128 can act as a stop for the end 134 of the spring.

In all cases, the end 134 of the spring 126 in the notch 135 is situated in the notch, between the collar 113 and the nut 128.

According to a first embodiment, the axial depth of the notch 135 is less than, or equal to, the axial thickness of a turn of the spring. Thus, when the nut 128 is screwed tightly against the collar, the end 134 is clamped between the collar and the nut 128. According to a second embodiment, the axial depth of the notch 135 is greater than the axial thickness of a turn of the spring. Thus, when the nut 128 is screwed tightly against the collar, it does not clamp the end 134 between the collar and the nut 128. In other words, when the nut 128 is screwed tightly against the collar, there is a gap between the end 134 of the collar on the one hand and the nut 128 on the other hand.

According to the first or second embodiment, the end 134 is sandwiched with or without a gap between the collar 113 and the nut 128. The nut 128 acts as a stop for the end 134 of the spring 126, and the collar 113 combined with the nut 128 permits total axial retention of the end 134, i.e. along the axis X, to the right and to the left.

The notch 135 is formed by an inner arch and an outer arch, and has a radial thickness between these two arches which is sufficient to receive the end 134. The outer arch combined with the outer arch[1] permits total radial retention, i.e. towards the inside and towards the outside of the end 134. The collar combined with the nut permits total axial retention, i.e. to the right and to the left, of the end 134.

[1] Translator's note: Presumably one of these two should be the "inner arch", not the "outer arch" twice.

FIG. 7 concerns in particular the collar 113 on the left axial end 114 side, the spring 126 and the nut 128. It will be appreciated that the same type of recess can be provided in the collar 113 on the right axial end 115 side, in order to retain the end of the spring 127.

However, the embodiment illustrated in FIG. 7 has a disadvantage. In fact, during the operation of the pulley assembly, the springs work in particular along the axis X, and since the end 134 is retained in the notch 136, a point of concentration of the stresses occurs. This point of concentration of the stresses can give rise to breakage of the spring by shearing. This point of concentration of the stresses is caused by the fact that part of the spring, i.e. its end 134, is fixed, retained radially towards the inside and the outside, whereas a part of the spring is mobile.

Figure 8:
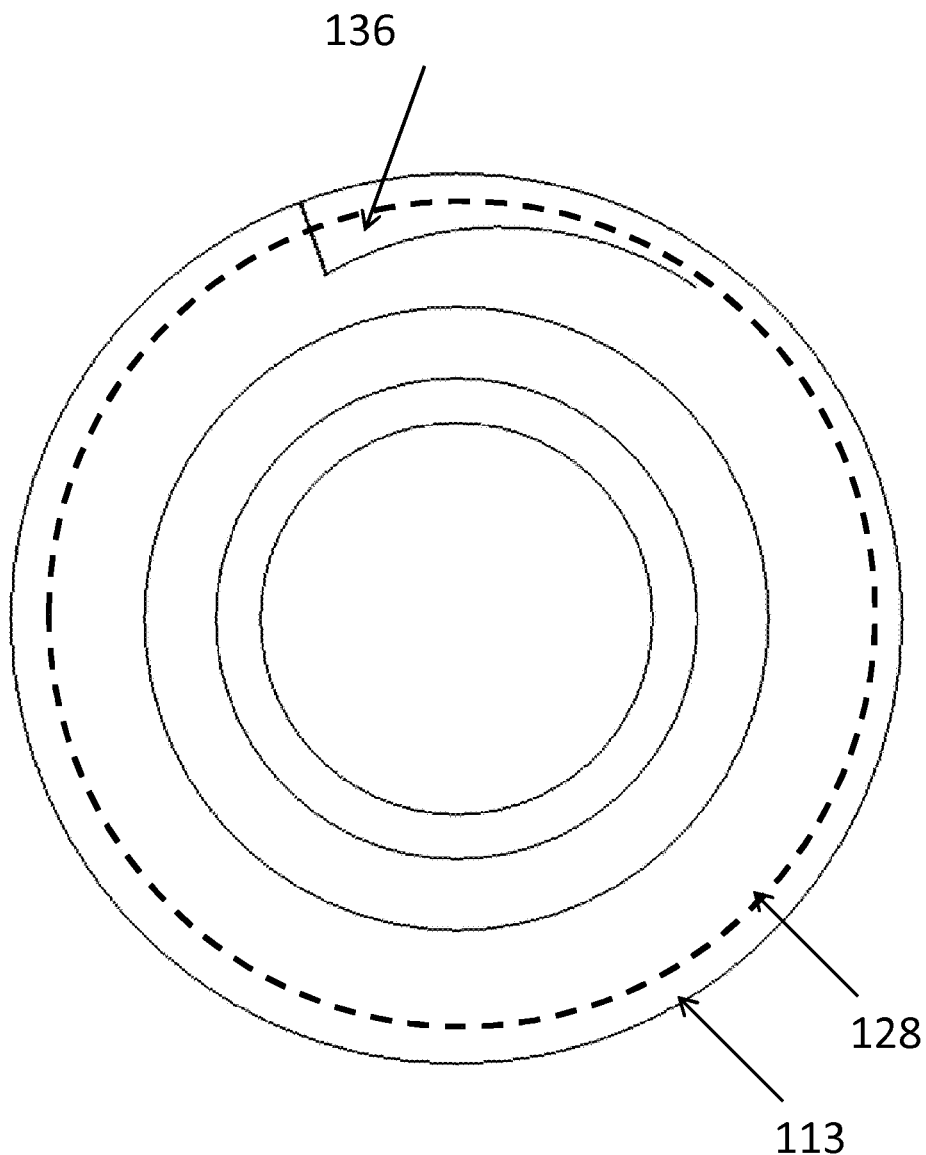
FIG. 8 shows a front view of the hollow shaft for the pulley assembly according to another embodiment of the invention.

FIG. 8 illustrates the collar 113 according to another embodiment seen according to the axis X, whilst being placed on the left axial end 114 side. This other embodiment does not have the disadvantage of the embodiment illustrated in FIG. 7. It is distinguished from the embodiment in FIG. 7 by the form of the recess provided in the collar 113, the form of which is different from that of the notch 135. In fact, this recess is open radially. Only an inner arch is defined, and there is no outer arch.

Just as for FIG. 7, this view also shows the four concentric circles with their centre on the axis X, corresponding to the same elements defined for the embodiment in FIG. 7. FIG. 8 additionally illustrates a fifth circle in a broken line representing the outer surface of the part of the nut 128 which faces the collar 113, i.e. it is not the outer surface of the radial shoulder.

A notch 136 is formed between the collar 113 and the nut 128. The notch 136 thus formed is designed to receive the end 134 of the spring 126. In other words, the end 134 of the spring 126 is accommodated in the notch 136 which is formed between the collar 113 and the nut 128. The notch 136 thus formed is open radially along the entire length of the portion of the spring which is accommodated in it.

In this other embodiment, according to a first example, the nut 128 can be screwed tightly against the collar, as can be seen in FIG. 3. According to another example, a thread or a tapping 132 can be provided which stops slightly beyond the collar, such that when the nut is fully screwed into the thread, it is not clamped on the collar. In both cases, the nut 128 can act as a stop for the end 134 of the spring.

In all cases, the end 134 of the spring 126 in the notch 136 is situated in the notch, between the collar 113 and the nut 128.

According to a first embodiment, the axial depth of the notch 136 is less than, or equal to, the axial thickness of a turn of the spring. Thus, when the nut 128 is screwed tightly against the collar, the end 134 is clamped between the collar and the nut 128.

According to this first embodiment, even when the nut is clamped against the end of the spring, the occurrence of a point of concentration of the stresses in the end of the spring is avoided because of the radial clearance possible for the spring, and the absence of an outer radial stop.

According to a second embodiment, the axial depth of the notch 136 can be greater than the axial thickness of a turn of the spring. Thus, when the nut 128 is screwed tightly against the collar, it does not clamp the end 134 between the collar and the nut 128. In other words, when the nut 128 is screwed tightly against the collar, there is a gap between the end 134 of the collar on the one hand and the nut 128 on the other hand.

According to the first or the second embodiment, the end 134 is sandwiched with or without a gap between the collar 113 and the nut 128. The nut 128 acts as a stop for the end 134 of the spring 126, and the collar 113 combined with the nut 128 permits total axial retention of the end 134, i.e. along the axis X, to the right and to the left.

On the other hand, the notch 136 does not ensure total radial retention. In fact, only an inner arch is defined in the recess in the collar 113, and there is no outer arch. Thus, only partial radial retention is possible, which partial radial retention makes it possible to limit the displacement of the end 134 towards the axis X. On the other hand, radial clearance is possible for the end 134 of the spring 126. There is therefore a notch defined by three support surfaces, i.e. the collar, the nut and the inner arch, which is open radially. In other words, the notch 136 is open radially along the entire length of the portion of the spring 126 which is accommodated in it.

This makes it possible to avoid the occurrence in the spring of a point which concentrates all the stresses, and would be liable to be a point of breakage of the spring.

Retention of the spring is however obtained without needing to secure one of its ends radially, because of the stop of the nut in combination with the collar.

FIG. 8 concerns in particular the collar 113 on the left axial end 114 side, the spring 126 and the nut 128. It will be appreciated that it is possible to provide the same type of recess in the collar 113 on the right axial end 115 side in order to retain the end of the spring 127. This therefore forms a notch 136 for the end of the spring 127 between the collar 113 and the nut 129. This notch, which is open radially along the entire length of the portion of the spring 127 which is accommodated in it, has the same advantages as those described above, relating in particular to the point of concentration of the stresses.

According to another embodiment, it is also possible for the pulley assembly 111 to comprise in addition a washer positioned around the hollow shaft 112, between the nut 128 or 129 and the collar 113, and the nut 128 or 129 is screwed tightly against the washer, the washer being clamped against the collar 113, and the end of the spring in the notch is situated between the washer and the collar 113.

According to this other embodiment, the notch 136 for receipt of the end of the spring can be formed between the collar 113 and the washer. Just as when it is formed between the nut and the collar, the notch is then open radially along the entire length of the portion of the spring which is accommodated in it.

The invention claimed is:

1. A pulley assembly comprising a hollow shaft provided with an axis, the hollow shaft being designed to be fitted on a shaft of a rotary electrical machine, the hollow shaft comprising at least one thread or tapping and a collar which extends radially towards the exterior, the said pulley assembly additionally comprising:
   a nut screwed onto the hollow shaft by the said at least one thread or tapping;
   a spring fitted around a part of the nut;
   at least one ball bearing fitted clamped on the hollow shaft;
   a pulley fitted clamped on the said at least one bearing, around the spring, the nut and the hollow shaft, wherein the nut comprises a radial shoulder fitted between the spring and the ball bearing, the spring being retained axially between the collar and the radial shoulder.

2. The pulley assembly according to claim 1, further comprising:

on the side of the collar which is axially opposite the said nut, a second nut, a second ball bearing and a second spring, wherein the second nut is screwed on the hollow shaft by the said at least one thread or tapping, the second spring is fitted around a part of the second nut, the second ball bearing is fitted tightly on the hollow shaft, and wherein the second nut comprises a radial shoulder fitted between the second spring and the second ball bearing, the second spring being retained axially between the collar and the radial shoulder of the second nut.

3. The pulley assembly according to claim 1, comprising at the collar a notch for receipt of the end of the spring.

4. The pulley assembly according to claim 3, wherein the nut is screwed tightly against the collar, and the end of the spring in the notch is situated between the collar and the nut.

5. The pulley assembly according to claim 3, wherein the nut forms an axial stop for the spring.

6. The pulley assembly according to claim 3, wherein the notch for receipt of the end of the spring is formed between the collar and the nut, the said notch being open radially along the entire length of the portion of the spring which is accommodated in it.

7. The pulley assembly according to claim 3, further comprising a washer positioned around the hollow shaft between the nut and the collar, and wherein the nut is screwed tightly against the washer, the washer being clamped against the collar, and the end of the spring in the notch being situated between the washer and the collar.

8. The pulley assembly according to claim 7, wherein the notch for receipt of the end of the spring is formed between the collar and the washer, the said notch being open radially along the entire length of the portion of the spring which is accommodated in it.

9. The pulley assembly according to claim 3, wherein the notch for receipt of the end of the spring is formed in the collar.

10. The pulley assembly according to claim 3, wherein the axial depth of the notch is greater than the axial thickness of a turn of the spring.

11. The pulley assembly according to claim 1, wherein the spring is a helical spring.

12. The pulley assembly according to claim 1, wherein the spring is a spring with rectangular turns.

13. The pulley assembly according to claim 1, wherein the nut and the spring permit coupling between the hollow shaft and the pulley.

14. The pulley assembly according to claim 1, wherein the nut is a brake nut.

15. A rotary electrical machine comprising a pulley assembly according to claim 1.

* * * * *